(12) United States Patent
Richter et al.

(10) Patent No.: US 10,539,219 B2
(45) Date of Patent: Jan. 21, 2020

(54) HOUSING FOR A MOTOR-TRANSMISSION UNIT AND METHOD OF MAKING THE HOUSING

(71) Applicant: Bühler Motor GmbH, Nürnberg (DE)

(72) Inventors: Olaf Richter, Stein (DE); Gerhard Hofmann, Großhabersdorf (DE); Michael Antes, Kunreuth (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 0 days.

(21) Appl. No.: 15/671,609

(22) Filed: Aug. 8, 2017

(65) Prior Publication Data

US 2018/0045292 A1 Feb. 15, 2018

(30) Foreign Application Priority Data

Aug. 12, 2016 (DE) .................. 10 2016 115 045

(51) Int. Cl.
*F16H 57/02* (2012.01)
*F16H 57/021* (2012.01)
(Continued)

(52) U.S. Cl.
CPC ......... *F16H 57/02* (2013.01); *B29C 45/0053* (2013.01); *B29D 99/006* (2013.01);
(Continued)

(58) Field of Classification Search
CPC ............. F16H 57/021; F16H 2055/176; F16H 2057/02008; F16H 2057/02034; F16H 2057/0325; H02K 7/116; B29L 2031/3481
See application file for complete search history.

(56) References Cited

U.S. PATENT DOCUMENTS 6,054,785 A 4/2000 Kerdjoudj et al.
7,118,506 B2 * 10/2006 Zheng .................. B62D 5/008
475/18
(Continued)

FOREIGN PATENT DOCUMENTS

DE 43 06 212 A1 9/1994
DE 196 13 814 A1 10/1997
(Continued)

OTHER PUBLICATIONS

English translation of Office Action dated Jun. 19, 2017, issued in counterpart German Application No. 10 2016 115 045.2 (8 pages).
(Continued)

*Primary Examiner* — Jacob S. Scott
*Assistant Examiner* — James J Taylor, II
(74) *Attorney, Agent, or Firm* — Westerman, Hattori, Daniels & Adrian, LLP

(57) ABSTRACT

A housing for a motor-transmission unit with at least two housing sections which have in each case at least one accommodation segment for receiving a motor and an internally-toothed, internal ring gear segment for receiving a gear of a planetary gear unit, wherein the housing sections can be or are connected with each other and wherein, in the assembled state, the accommodation segments of the housing sections together form at least one accommodation compartment for holding the motor, and the internal ring gear segments of the housing sections together form an internal ring gear for mating with a gear on the planetary gear unit.

17 Claims, 3 Drawing Sheets

(51) Int. Cl.
*H02K 5/22* (2006.01)
*H02K 7/116* (2006.01)
*F16H 57/08* (2006.01)
*F16H 57/032* (2012.01)
*B29C 45/00* (2006.01)
*B29D 99/00* (2010.01)

(52) U.S. Cl.
CPC ............ *F16H 57/021* (2013.01); *H02K 5/22* (2013.01); *H02K 7/116* (2013.01); *F16H 57/08* (2013.01); *F16H 2057/02008* (2013.01); *F16H 2057/02034* (2013.01); *F16H 2057/0325* (2013.01)

(56) References Cited

U.S. PATENT DOCUMENTS

| | | | | |
|---|---|---|---|---|
| 8,142,321 B2* | 3/2012 | Guttenberger | .......... | F16H 57/08 29/893.1 |
| 8,450,896 B2* | 5/2013 | Weber | .................... | F02D 9/107 310/89 |
| 2005/0046290 A1* | 3/2005 | Baukholt | .................. | F16H 1/46 310/75 R |
| 2010/0060092 A1 | 3/2010 | Blakesley et al. | | |
| 2013/0313930 A1* | 11/2013 | Fuchs | ...................... | B62M 6/65 310/83 |
| 2015/0345851 A1 | 12/2015 | Ramirez, Jr. | | |

FOREIGN PATENT DOCUMENTS

| | | |
|---|---|---|
| DE | 298 02 533 U1 | 6/1998 |
| DE | 197 52 672 C1 | 3/1999 |
| DE | 696 22 196 T2 | 10/2002 |
| DE | 10 2008 030 006 A1 | 12/2009 |
| DE | 10 2009 025 348 A1 | 12/2010 |
| DE | 20 2010 012 750 U1 | 3/2012 |

OTHER PUBLICATIONS

Office Action dated Jun. 19, 2017, issued in counterpart German Application No. 10 2016 115 045.2. (10 pages).

* cited by examiner

HOUSING FOR A MOTOR-TRANSMISSION UNIT AND METHOD OF MAKING THE HOUSING

BACKGROUND OF THE INVENTION

(1) Field of the Invention

The invention relates to a housing for a motor-transmission unit, to a motor-transmission unit with such a housing, and also to a manufacturing process for making the housing.

(2) Description of Related Art Including Information Disclosed Under 37 CFR 1.97 and 1.98

Motor-transmission units, especially, with an electric motor and a planetary gear unit, are used in many industrial applications. These range from applications in the automotive industry to medical technology. Irrespective of the field of application, it is necessary in most cases to encapsulate the motor-transmission unit in a housing, for example, to protect the motor-transmission unit against contamination.

For this reason, in assembling the motor-transmission unit, the motor should be assembled first, then the motor should be connected to a previously assembled planetary gear unit, and the entire motor-transmission unit then encapsulated in a housing. The result is a relatively high number of assembly steps. In contrast, it is desirable to reduce the assembly steps in the interest of simplified and economical production. At the same time, it is desirable, as part of the miniaturization of modules constantly being pursued, to give the motor-transmission unit together with the housing a design which is as compact as possible.

The aim of the invention is to provide an inventive housing for a motor-transmission unit that makes possible a reduction in the number of assembly steps and a compact design for the motor-transmission unit. In addition, it is an aim of the invention to provide a motor-transmission unit with the inventive housing, as well as a manufacturing process for such an inventive housing.

BRIEF SUMMARY OF THE INVENTION

The invention is based upon the idea of providing a housing for a motor-transmission unit with at least two housing sections, which have in each case at least one accommodation segment for a motor and an internal ring gear segment with internal toothing for working with toothed gears of a planetary gear unit. The housing sections can be or are connected with each other. In the assembled state, the accommodation segments of the housing sections together form at least one accommodation compartment for the motor. The internal ring gear segments of the housing sections in the assembled state jointly form an internal ring gear that meshes with a geared portion of the planetary gear unit.

The invention is based upon the idea of functionally integrating into the housing an internal ring gear for a planetary gear unit. In this way, the need to produce a separate internal ring gear is avoided, and, consequently, one component does not have to be made. This directly affects the assembly of the motor-transmission unit. In particular, one assembly step is saved in order that the motor-transmission unit can be manufactured inexpensively and with less effort. In addition, the effect of the functional integration of the internal ring gear of a planetary gear unit into the housing is that the housing with the motor-transmission unit can be given an overall compact design. This increases the range of possible applications for the motor-transmission unit.

Assembly of the motor-transmission unit within the housing is further facilitated by the housing sections in one preferred embodiment having a mirror-symmetrical design, i.e. the sections are mirror images of each other. This facilitates the handling of the individual housing sections during production. In particular, handling sequences can thus be standardized.

One preferred embodiment of the housing according to the invention envisages the housing sections being positively joined together, in particular, tongue-and-groove connection. Positive-locking connection the housing sections is also conducive to an easier and more secure assembly. Furthermore, tightness against leaks within the housing can be ensured by the positive-locking connection of the housing sections. Alternatively or additionally, joining the housing sections together by laser welding and/or ultrasonic welding is also envisaged. A welding process of this kind can be carried out simply and efficiently with robot support and considerably improves the leak tightness of the housing.

Preferably, in a preferred embodiment, the first and second housing sections of the housing in each case consist of a single piece. In this way, the manufacture or production of the housing is also simplified. In particular, it can be envisaged that, in each case, the internally-toothed, internal ring gear segment and the accommodation segment of a housing section take the form of a single component, in particular, having, as a whole, a monolithic design.

The housing sections can in each case take the form of, in particular, uniformly monolithic injection-molded parts. In this connection, it is particularly advantageous when the housing consists of at most first and second housing sections. In this way, the number of injection molds can be reduced to a minimum, which keeps production costs for the housing low.

It is particularly preferred if the housing sections are formed from the same material, preferably, a plastic material. Overall, using a uniform material for production of the housing is contemplated. This simplifies production of the housing and also enables the housing sections to be well and securely connected to each other. In particular, various temperature-influenced deformations of the housing sections are evened out by employing a uniform material. The long-term durability and tightness against leaks of the assembled housing is thus improved. Moreover, the use of a uniform housing enables the housing sections to be connected in a simple manner by laser welding or ultrasonic welding.

A subsidiary aspect of the present invention relates to a motor-transmission unit having a housing as described above. The effects and advantages described above in connection with the housing apply correspondingly to the motor-transmission unit. In particular, the motor-transmission unit can be produced simply and inexpensively, and is characterized by having a particularly high degree of compactness and a small number of individual components. These advantages are achieved, in particular, by the fact that an internally-toothed, internal ring gear is directly integrated into the housing, thus allowing the saving of a separate internal ring gear for a gear set such as a planetary gear set.

In a preferred variant of the motor-transmission unit according to the invention, it is envisaged that a rotor, in particular, a rotor for a motor, is arranged in the accommodation compartment of the housing. The rotor is preferably mounted in a rotor bearing, wherein the rotor bearing is formed by at least two bearing segments. The bearing segments are in each case molded into a housing section of the housing. In other words, not only an internally-toothed, internal ring gear but, additionally, a rotor bearing, can be functionally integrated into the housing. This further facilitates the assembly of the motor-transmission unit. In particular, the rotor can, in this way, be simply inserted into the housing. When the housing sections are connected together to close off the housing, the rotor bearing is simultaneously completed, so that the rotor can rotate simply and securely in the housing.

Furthermore, a stator for an electric motor can also be positively fitted with positive locking into the accommodation compartment of the housing. This is also associated with a facilitation of the assembly of the motor-transmission unit. In particular, additional mountings of the stator in the housing can be dispensed with. Moreover, the flush embedding of the stator in the housing, permits a further miniaturization of the motor-transmission unit.

In particular, the stator and the rotor can be inserted in the accommodation compartment as mutually independent, that is mechanically separated assemblies. Within the housing, the stator and the rotor preferably jointly make up a motor, in particular, a brushless DC motor. A DC motor with brushes can also be used instead of a brushless DC motor.

The stator and the rotor can be provided as separate assemblies. During assembly of the motor-transmission unit, these separate assemblies can be inserted individually into the housing sections and be functionally connected to each other by joining the housing sections together. On the one hand, this facilitates the assembly of the motor-transmission unit. On the other hand, this makes it possible to easily combine, as required, different combinations of rotors and stators in a production line. This makes it a quick and simple matter to make customer-specific motor-transmission units.

In a further preferred embodiment of the motor-transmission unit according to the invention, it is envisaged that a control printed circuit board (PCB) be fitted with positive locking into a further accommodation compartment of the housing. In addition to the control PCB, the further accommodation compartment can accommodate batteries or accumulators, as well as control elements, especially, switches and connectors. The batteries or accumulators, connectors, and/or control elements may be connected to the control PCB and, together with the control PCB, fitted into the further accommodation compartment. Overall, the housing of the motor-transmission unit can integrate all essential elements of the motor, including control and connection elements, that the over result is a compact and motor-transmission.

The accommodation compartment for the motor and the further accommodation compartment for the control PCB are preferably separated by a dividing wall. The dividing wall has at least one dividing-wall section that forms a single piece with a housing section. In the assembled state, the dividing-wall section is preferably in contact with an adjacent housing section, and thus stabilizes the assembled housing. In addition, the separation of the accommodation compartment from the further accommodation compartment has the advantage that assembly is made easier, especially in the case of manual assembly. In particular, it is thus clearly defined how individual components are to be fitted into e housing.

It is especially preferred when the at least two housing sections in each case have a dividing-wall section, wherein the dividing-wall sections can be or are connected with each other by positive locking. The positive-locking connection of the dividing-wall sections, for example, by means of a tongue-and-groove connection, improves the leak tightness and the stability of the housing.

A further ancillary aspect oaf the invention relates to a procedure for the manufacture of a housing or a motor-transmission unit, in particular, with the aforementioned features, wherein the procedure comprises the following steps:

Injection-molding of at least two housing sections lade of a plastic material, wherein an internally-toothed, internal ring gear segment is, in each case, molded into the housing sections and at least one accommodation segment, and Positive-locking joining of the housing sections, to create a housing with an integrated, internally-toothed, internal ring gear and at least one integrated accommodation compartment.

The effects and advantages described in connection with the housing and the motor-transmission unit also emerge analogously for the manufacturing process according to the invention. In particular, using the manufacturing process described here reduces the assembly effort required for a motor-transmission unit with a housing, and thus makes low-cost production possible. Furthermore, the procedure makes it possible to produce a particularly compact motor-transmission unit in a simple manner.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
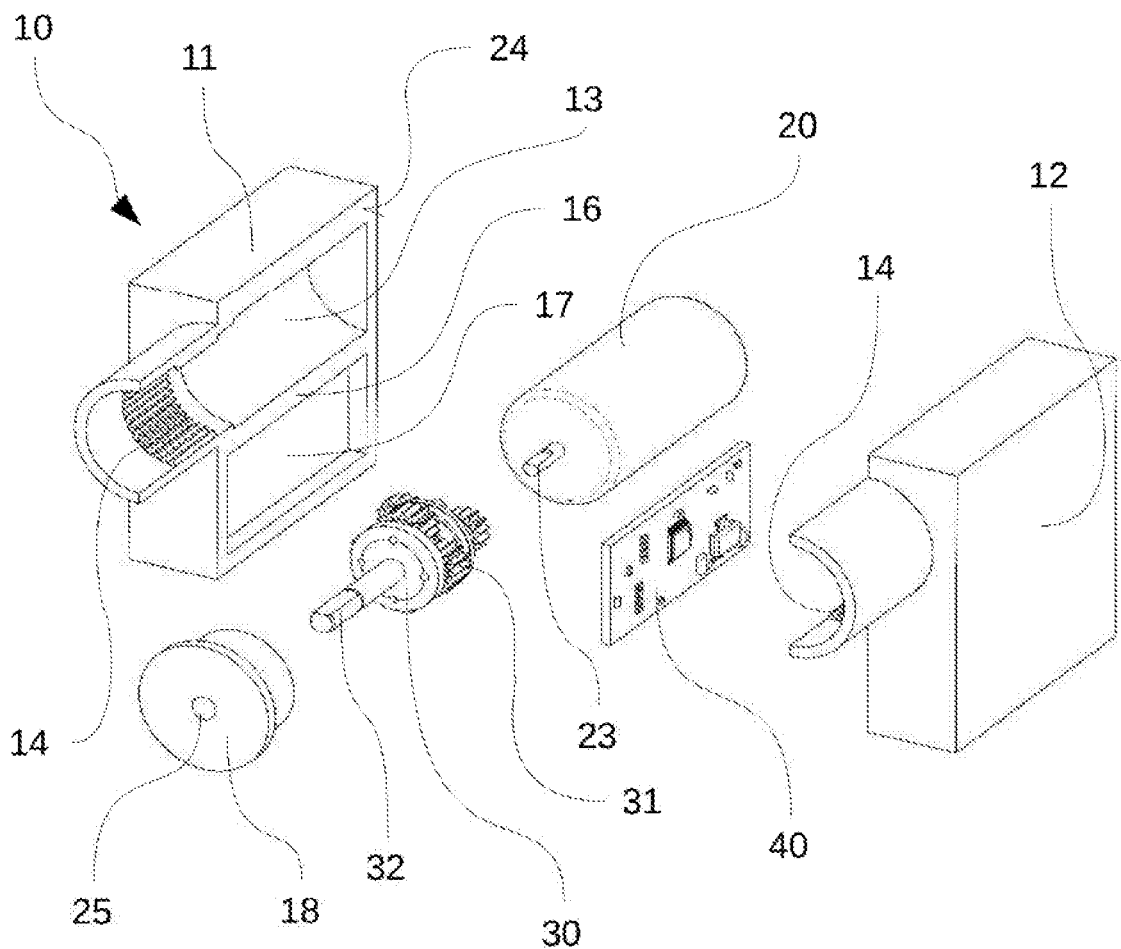
FIG. 1 is an exploded view of a motor-transmission unit with a housing according to the invention, following a preferred embodiment.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 specifically shows a housing 10, in which a motor-transmission unit is encapsulated. The motor-transmission unit comprises a motor 20 and a planetary gear unit 30. The motor 20 preferably takes the form of a DC motor, such as a brushless DC motor or brush-type motor. The motor 20 and the planetary gear unit 30 are mechanically connected via a rotor shaft 23 on the motor, which engages the planetary gear unit 30. The planetary gear unit 30 has several planetary gears 31, which mesh with an internal ring gear formed from two internal ring gear segments 14 defined in the housing 10. The internal ring gear is integrated in the housing 10, as is explained in greater detail below.

In all embodiments, the housing 10 consists of at least two housing sections 11, 12. In particular, the housing 10 has a first housing section 11 and a second housing section 12. The first housing section 11 and the second housing section 12 can be connected together to form a closed housing 10.

Each of the housing sections 11, 12 has an accommodation segment 13. The motor 20 can be inserted with positive locking into the accommodation segment 13. As is clearly shown in FIG. 1, the accommodation segment 13 has in this respect a semi-cylindrical internal contour which is matched to the cylindrical shape of the motor 20. The external contour can also be given a non-circular form, which enables implementation of a simpler transmission of torque or anti-rotation locking between the motor and the housing. When the first housing section 11 is connected to the second housing section 12, the accommodation segments 13 jointly form an accommodation compartment, within which the motor 20 is encapsulated. In this regard, the accommodation segment has an internal contour which corresponds to the cylindrical external contour of the motor 20.

In addition, the housing sections 11, 12 in each case have an internally-toothed, internal ring gear segment 14. The internal ring gear segment 14 abuts directly onto the accommodation segment 13. In particular, the accommodation segment 13 and the internal ring gear segment 14 can be made from a single piece. In the connected state of the housing sections 11, 12, the internal ring gear segments 14 of the housing sections 11, 12 together form an internal ring gear with internal toothing. In this respect, the internal ring gear is directly integrated into the housing 10 or forms an integral part of the housing 10. The planetary gears 31 of the planetary gear unit 30 operatively engage the internal toothing of the internal ring gear. The internal ring gear is preferably coaxially aligned with the accommodation compartment of the housing 10.

As can be seen from FIG. 1, the housing sections 11, 12 in each case have a further accommodation segment 17, which is separated from the accommodation segment 13 by a dividing-wall segment 16. The dividing-wall segment 16 extends across the housing sections 11, 12 and, together with the housing sections 11, 12, forms a flush connecting surface 24. The two housing sections 11, 12 can be connected together and sealed via the connecting surface 24.

In the assembled state of the housing 10, the other accommodation segments 17 of the first housing section 11 and of the second housing section 12 form a further accommodation compartment for a control PCB 40. The further accommodation compartment is preferably so dimensioned that the control PCB 40 can be fitted into it essentially with positive locking. In order to create an electrical connection between the control PCB 40 and the motor 20, it can be envisaged that at least one dividing-wall segment 16 of a housing section 11, 12 have a cable feedthrough or a contact element, which can be inserted or injection-molded. The cable feedthrough can, in particular, take the form of a recess in the area of the connecting surface 24 of the dividing-wall segment 16.

A bearing cap 18 is envisaged for closing off the housing 10 and for receiving the output shaft 32 of the planetary gear unit 30. The bearing, cap 18 can be inserted with positive locking into the internal ring gear segment 14 of the housing sections 11, 12, and thus closes off the internal ring gear segment 14 along the longitudinal axis of the accommodation segment 13. A central hole 25 is provided in the bearing cap 18, through which the output shaft 32 of the planetary gear unit 30 extends. The central hole 25 can at the same time serve as a bearing for the output shaft 32.

Figure 2:
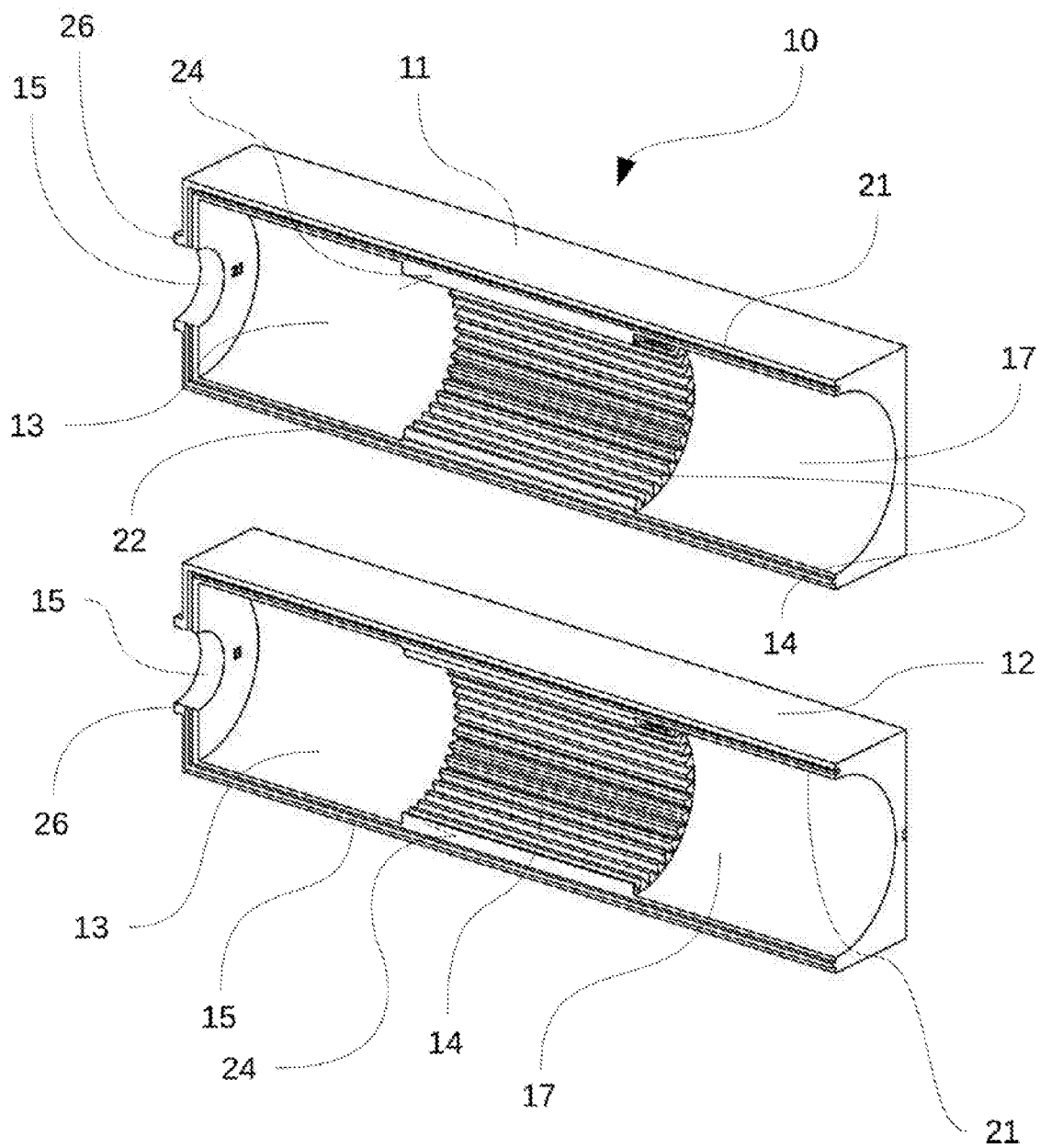
FIG. 2 is a perspectival view of two housing sections of a housing according to the invention, following a further preferred embodiment.

FIG. 2 shows an alternative embodiment for a housing 10 which comprises two housing sections 11, 12. The two housing sections 11, 12 are essentially identical in form. Each housing section 11, 12 includes an interior compartment which is essentially the shape of part of a cylinder. The entire housing 10 forms a cylindrical internal contour which is divided into various functional segments adjacent to each other along the longitudinal axis of the housing.

In the embodiment shown in FIG. 2, it is specifically envisaged that the housing sections 11, 12 each include an accommodation segment 13 for a motor 20. An internal ring gear segment 14 which has internal toothing abuts directly onto the accommodation segment 13. In the longitudinal direction of the housing, a further accommodation segment 17 adjoins the internal ring gear segment 14, wherein the further accommodation segment 17 can, for example, serve for the accommodation of a control PCB 40. An alternative use for the further accommodation segment 17 is possible.

A bearing segment 15 is envisaged at one longitudinal end of each of the housing sections 11, 12. The bearing segment 15 is essentially formed by a through-opening with a reinforcing wall 26 projecting externally beyond the housing. A rotor shaft 23 of a motor 20 can be inserted into the bearing segment 15 and, in the assembled state of the housing 10, be supported in it.

The two housing sections 11, 12 have in each case a connecting surface 24, which is, in part, provided with a groove 21, and, in part, with a tongue 22. The groove 21 is so arranged here that a tongue 22 of the other housing section 12, 11 can engage with the groove 21 in order to join the housing sections 11, 12. In this respect, a positive-locking connection of the housing sections 11, 12 is ensured.

In all embodiments, the housing sections 11, 12 preferably take the form of injection moldings. In particular, in the embodiment shown in FIG. 2, the same injection molding tool can be used for both housing sections 11, 12. The housing sections 12, are identical in this respect and, in each case, have a nut 21 and a tongue 22 on their connecting surface 24, such that the two housing sections 11, 12 can be joined together by positive locking. This significantly reduces the costs of production.

Figure 3:
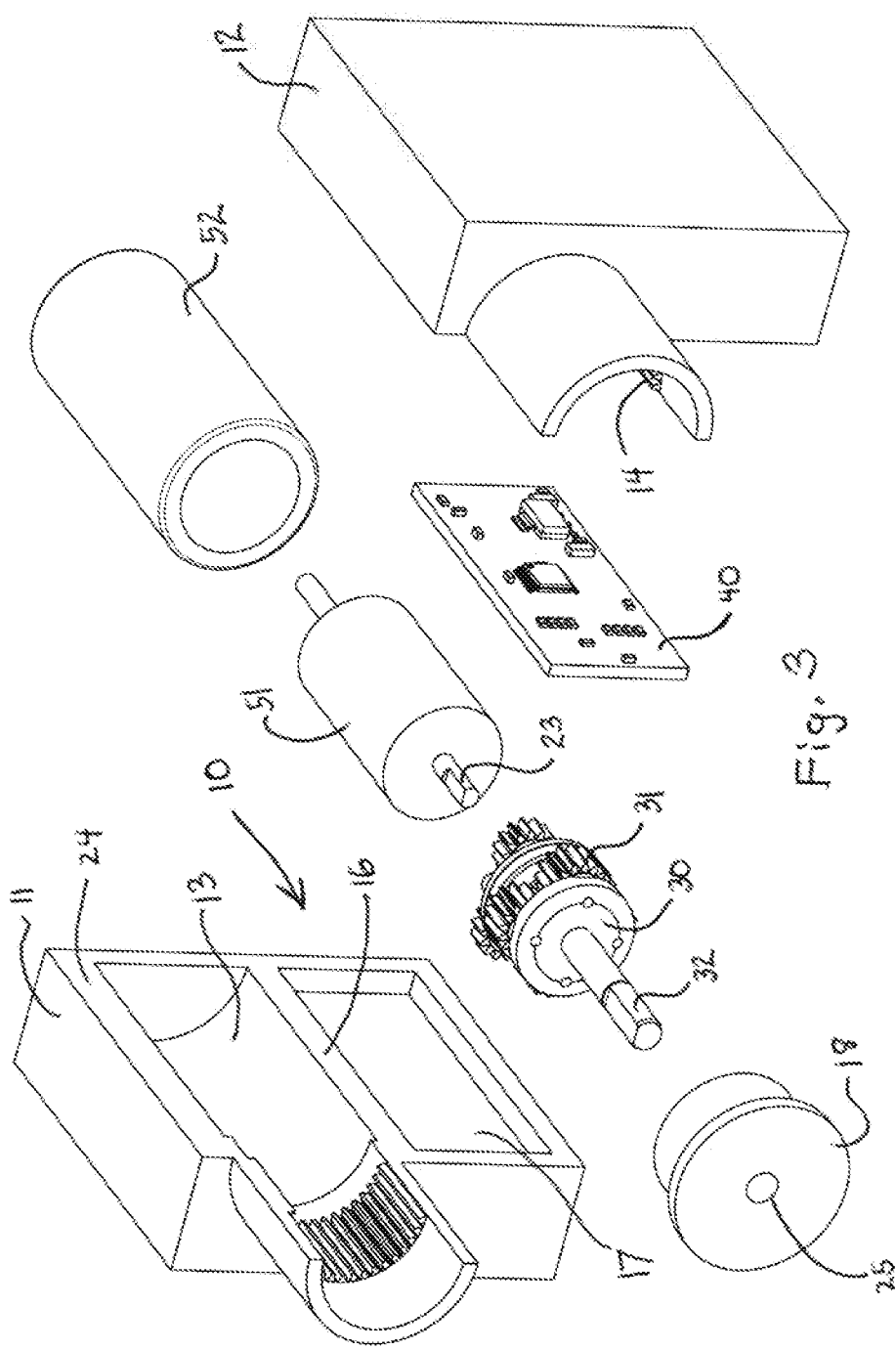
FIG. 3 is an exploded view of a motor-transmission unit wherein the motor is made from separate stator and rotor pieces.

In FIG. 3, a stator 52 for an electric motor can also be fitted with positive locking into the accommodation compartment 13 of the housing 10. This is also associated with a facilitation of the assembly of the motor-transmission unit. In particular, additional mountings of the stator 52 in the housing can be dispensed with. Moreover, the flush embedding of the stator in the housing permits a further miniaturization of the motor-transmission unit.

In particular, the stator 52 and the rotor 51 can be inserted in the accommodation compartment as mutually independent, mechanically separated, assemblies. Within the housing 10, the stator 52 and the rotor 51 preferably jointly make up a motor 20 (As shown in FIG. 1)—in particular, a brushless DC motor. A DC motor with brushes can also be used instead of a brushless DC motor. To makeup the motor 20, the rotor 51 is operatively positioned in the stator 52.

The stator 52 and the rotor 51 can be provided as separate assemblies. During assembly of the motor-transmission unit, these separate assemblies can be inserted individually into the housing sections 11 and 12 and be functionally connected to each other by joining the housing sections together. On the one hand, this facilitates the assembly of the motor-transmission unit. On the other hand, this makes it possible to easily combine, as required, different combinations of rotors and stators in a production line. This makes it a quick and simple matter to make customer-specific motor-transmission units.

The motor-transmission unit with the housing sections 10 is preferably used in the fields of medical technology, shading systems, and automotive technology. Here, the housing 10 is especially suitable for motors 20, in particular, brushless DC motors—that have an external diameter between 5 mm and 100 mm in particular, between 6 mm and 90 mm, and, preferably, between 8 mm and 80 mm. Due to the integration of the internal ring gear into the housing 10, the size of the motor-transmission unit with the housing 10 can be reduced overall. Furthermore, vibration-induced noise is reduced by the small number of components.

A motor-transmission unit with the housing 10 is preferably manufactured by the following steps:

Injection-molding of at least two housing sections 11, 12;
Connecting the motor 20 mechanically to the planetary gear unit 30;
Inserting the motor-transmission unit consisting of motor 20 and planetary gear unit 30 into a first housing section 11, so that the planetary gears 31 of the planetary gear unit 30 engage with the internal toothing of the internal ring gear segment 14, and the motor 20 is embedded in the accommodation segment 13;
Optional insertion into the further accommodation segment 17 of a control PCB 40:
Placing the second housing section 12 on top of the first housing section 11, so that the motor-transmission unit is completely enclosed by the housing sections 11, 12;
Connecting the housing sections 11, 12 to each other by positive locking and/or by laser welding or ultrasonic welding; and
Fitting a bearing cap 18, to close off the housing 10.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

10 Housing
11 First housing section
12 Second housing section
13 Accommodation segment
14 Internal ring gear segment
15 Bearing segment
16 Dividing-wall segment
17 Further accommodation segment.
18 Bearing, cap
20 Motor
21 Groove
22 Tongue
23 Rotor shaft
24 Connecting surface
25 Central hole
26 Reinforcing wall
30 Planetary gear unit
31 Planetary gear
32 Output shaft
40 Control PCB

What is claimed is:

1. A housing for a motor-transmission unit having a motor and a planetary gear unit having gears, the housing comprising:
    first and second housing sections each having at least one accommodation segment for a motor and an internally-toothed, internal ring gear segment for a planetary gear unit,
    wherein the first and second housing sections are configured to be connected with each other,
    wherein, in an assembled state, the accommodation segments of the first and second housing sections together form at least one accommodation compartment for the motor, and the internal ring gear segments of the first and second housing sections together form an accommodation compartment for the planetary gear unit including an internal ring gear for meshing with gears of the planetary gear unit,
    wherein the accommodation compartment for the motor is continuous with the accommodation compartment for the planetary gear unit at all radial positions of the planetary gear unit, and
    wherein the accommodation compartment for the motor is entirely closed on a first axial end thereof and is at least partially open on a second axial end thereof.

2. The housing according to claim 1, wherein at least portions of the first and second housing sections are identical.

3. The housing according to claim 1, further comprising joining means for joining the first and second housing sections together by positive locking.

4. The housing according to claim 3, wherein the joining means comprises a tongue-and-groove connection.

5. The housing according to claim 1, wherein the first and second housing sections each consist of a single piece.

6. The housing according to claim 1, wherein the first and second housing sections are each injection molded.

7. The housing according to claim 1, wherein the first and second housing sections are made of the same material.

8. The housing according to claim 7, wherein the material is a plastic material.

9. A motor-transmission unit comprising:
    a motor having a rotor shaft;
    a planetary gear unit having a first end for receiving the rotor shaft and a second end terminating in an output shaft;
    first and second housing sections each having at least one accommodation segment for receiving the motor and an internally-toothed, internal ring gear segment for operatively connecting to the planetary gear unit,
    wherein the first and second housing sections are connected with each other,
    wherein, in an assembled state, the accommodation segments of the first and second housing sections together form at least one accommodation compartment for the motor, and the internal ring gear segments of the first and second housing sections together form an accommodation compartment for the planetary gear unit including an internal ring gear for the planetary gear unit, and
    wherein the accommodation compartment for the motor is continuous with the accommodation compartment for the planetary gear unit at all radial positions of the planetary gear unit, and wherein the accommodation compartment for the motor is entirely closed on a first axial end thereof and is at least partially open on a second axial end thereof.

10. The motor-transmission unit according to claim 9, wherein a rotor is arranged in the accommodation compartment for the motor, the rotor being rotatably supported in a rotor bearing, and
wherein the rotor bearing is formed by at least two bearing segments, each of the two bearing segments being formed in a respective one of the first and second housing sections of the housing.

11. The motor-transmission unit according to claim 9, wherein
a stator for the motor is fitted by positive locking into the accommodation compartment for the motor.

12. The motor-transmission unit according to claim 9, wherein a stator and a rotor are inserted in the accommodation compartment for the motor as separate assemblies and, within the housing, jointly make up the motor.

13. The motor-transmission unit according to claim 12, wherein the motor is a brushless DC motor.

14. The motor-transmission unit as according to claim 9, further comprising a control PCB fitted by positive locking into a second accommodation compartment of the housing.

15. The motor-transmission unit according to claim 14, wherein the accommodation compartment for the motor and the second accommodation compartment for the control PCB are separated by a dividing wall, the dividing wall having at least one dividing-wall segment which is integral with the first and second housing sections.

16. The motor-transmission unit according to claim 9, wherein the first and second housing sections each have a dividing-wall segment, and
wherein the dividing-wall segments are configured to be connected with each other by positive locking.

17. A method of making the housing according to claim 1 comprising the steps of:
injection-molding of the first and second housing sections made of a single plastic material, each housing section including the internally-toothed, internal ring gear segment and the at least one accommodation segment, and
positive-locking and joining of the first and second housing sections to create the housing with the integrated, internally-toothed, internal ring gear and the integrated accommodation compartment for the motor.

* * * * *